(12) United States Patent
Brandenburger

(10) Patent No.: US 6,386,653 B1
(45) Date of Patent: May 14, 2002

(54) APPARATUS AND METHOD FOR MEASURING AND REALIGNING TRACK MISALIGNMENT

(75) Inventor: Steven J. Brandenburger, Minneapolis, MN (US)

(73) Assignee: Caterpillar Paving Products Inc., Minneapolis, MN (US)

(*) Notice: Subject to any disclaimer, the term of this patent is extended or adjusted under 35 U.S.C. 154(b) by 0 days.

(21) Appl. No.: 09/533,980

(22) Filed: Mar. 23, 2000

(51) Int. Cl.[7] .............................................. B62D 55/00
(52) U.S. Cl. ........................ 305/116; 305/144; 180/9.1
(58) Field of Search ................................ 305/116, 124, 305/143, 144, 153; 180/9.1, 9.44, 9.52

(56) References Cited

U.S. PATENT DOCUMENTS

| | | | |
|---|---|---|---|
| 3,015,803 A | | 1/1962 | Neu |
| 3,711,165 A | | 1/1973 | Russ, Sr. |
| 3,972,569 A | * | 8/1976 | Bricknell .................... 305/144 |
| 3,998,549 A | | 12/1976 | Pusch et al. |
| 4,068,811 A | | 1/1978 | Caulier |
| 4,405,026 A | * | 9/1983 | Merrifield ................. 180/9.62 |
| 4,458,954 A | * | 7/1984 | Haas .......................... 305/144 |
| 4,878,761 A | | 11/1989 | Duhrkoop |
| 4,953,919 A | * | 9/1990 | Langford ..................... 305/144 |
| 5,031,973 A | * | 7/1991 | Gillet ......................... 305/144 |
| 5,127,714 A | | 7/1992 | Satzler |
| 5,201,483 A | | 4/1993 | Sutnar et al. |
| 5,312,176 A | | 5/1994 | Crabb |
| 5,397,900 A | | 3/1995 | Wetzler |
| 5,433,525 A | | 7/1995 | El-Ibiary |
| 5,448,072 A | | 9/1995 | Gallagher |
| 5,478,151 A | | 12/1995 | Duhrkoop |
| 5,639,148 A | * | 6/1997 | Sheidler ..................... 305/116 |
| 5,660,470 A | | 8/1997 | Mench |
| 6,024,183 A | * | 2/2000 | Dietz et al. ................. 180/9.1 |

FOREIGN PATENT DOCUMENTS

EP     0 585 721     8/1993

* cited by examiner

*Primary Examiner*—Russell D. Stormer
(74) *Attorney, Agent, or Firm*—Jeff A. Greene

(57) ABSTRACT

Track laying work machines (10) are provided with a pair of track roller assemblies (20) positioned on opposite sides of the work machine (10). Each track roller assembly (20) includes a track (12) entrained around a drive wheel (14), an idler wheel (16), and a plurality of supporting mid-rollers (18). An apparatus for measuring misalignment and realigning (48) the track (12) is utilized to monitor alignment and align the track (12) during operation of the work machine (10).

22 Claims, 4 Drawing Sheets

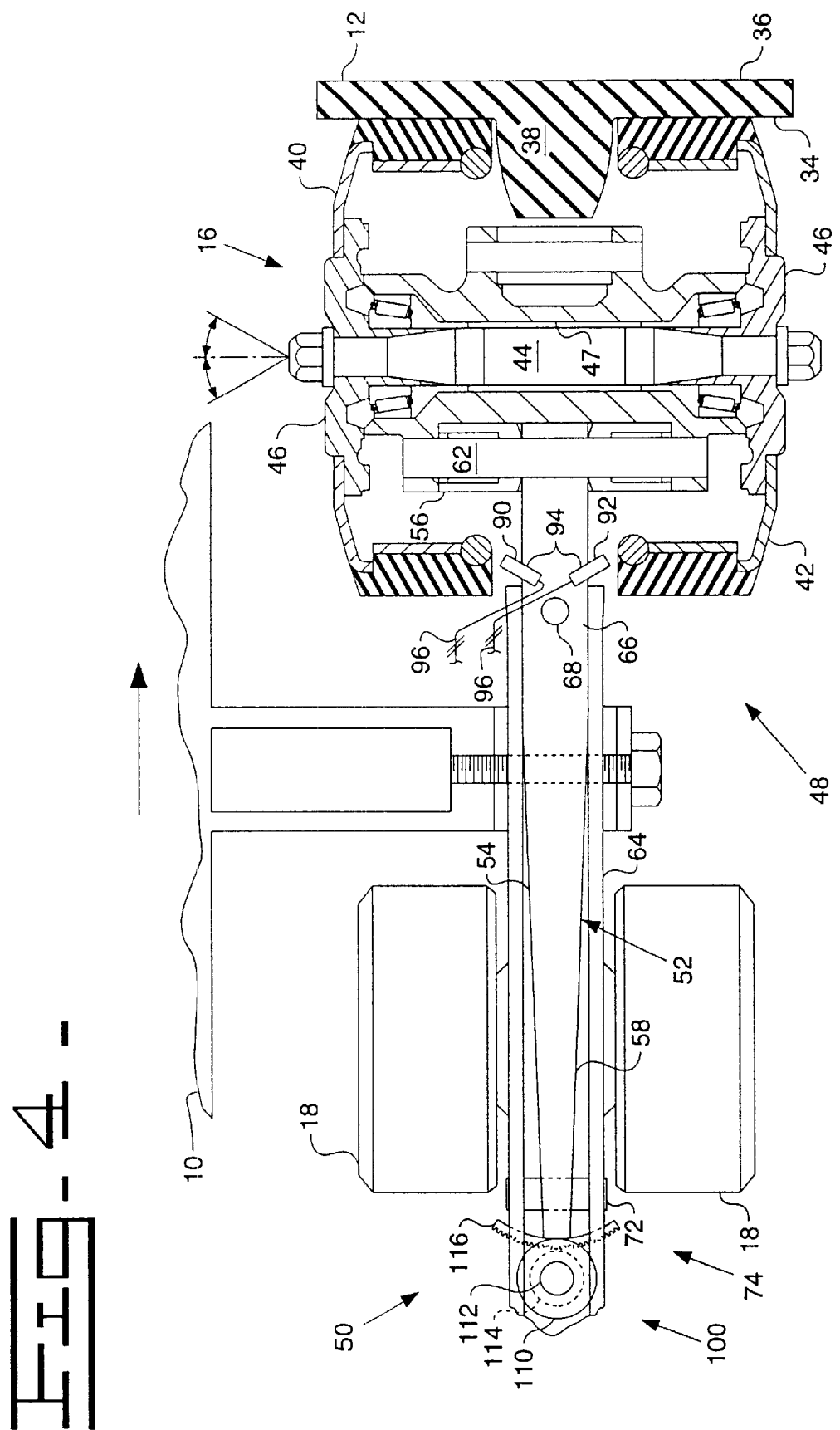

APPARATUS AND METHOD FOR MEASURING AND REALIGNING TRACK MISALIGNMENT

TECHNICAL FIELD

This invention relates generally to a track system for a work machine and, more particularly, to an apparatus and method for measuring and realigning track misalignment during operation.

BACKGROUND ART

Some present day endless track laying work machines utilize a track that is an endless rubber belt as the means for propulsion. The endless rubber belt is tensioned into frictional engagement with and entrained about a drive wheel and an idler wheel. Problems encountered in reducing such an endless track laying work machine to practice include how to maintain adequate tension on such belt and laterally aligning the belt to run true with the drive and idler wheels. Other problems are maintaining the structural integrity and providing long life of the belt and other associated drive train components.

Examples of prior belt alignment mechanism are shown in U.S. Pat. Nos. 5,127,714 and 5,312,176. In both examples the alignment of the track is adjusted by moving an arm that is pivotally attached to the idler wheel. Movement of the arm is accomplished through a jack screw arrangement with a jam nut used to lock the arm in place. Both patents provide a manual means for adjusting the alignment of the idler wheel to keep the belt in proper alignment and entrained around the drive and idler wheels during assembly or a maintenance procedure. However, neither patent provides an apparatus or method for measuring misalignment during operation of the endless track laying work machine at the time of initial startup or as components wear or loosen and then realigning thereafter.

The present invention is directed to overcoming one or more of the problems as set forth above.

DISCLOSURE OF THE INVENTION

In one aspect of the current invention an apparatus for measuring misalignment and realigning a track on a work machine is provided. The work machine utilizes a pair of track roller assemblies each having a track entrained around a drive wheel and an idler wheel. The idler wheel has first and second wheel segments one each being rotatably positioned on opposite sides of a plurality of guide elements. The guide elements are positioned on an inner surface of the track. The apparatus has a sensor positioned adjacent the first and second wheel segments and a controller in communication with the at least one sensor.

In another aspect of the current invention a method is provided for aligning a track of a work machine. The work machine utilizes a pair of track roller assemblies each having a track entrained around a drive wheel and an idler wheel. The idler wheel has first and second wheel segments rotatably positioned on opposite sides of a plurality of guide elements. The plurality of guide elements are positioned on an inner surface of the track. The method comprises the steps of sensing a parameter indicative of the contact between the first wheel segment and the plurality of guide elements, and responsively delivering a first signal. Sensing a parameter indicative of the contact between the second wheel segment and the plurality of guide elements, and responsively delivering a second signal. Delivering a differential range signal indicative of a desired contact differential between one of the first and second wheel segments and the first and second sides of the plurality of guide elements. Determining an actual contact differential based on a comparison of the first signal and the second signal. Comparing the actual differential and the desired differential range. And pivoting the idler wheel responsive to the higher of the first and second signals until the actual differential falls within the desired differential range.

BRIEF DESCRIPTION OF THE DRAWINGS

FIG. 4 is an enlarged sectional view of a forth embodiment of the measuring and realigning apparatus taken along line 2—2 of the idler wheel of FIG. 1.

BEST MODE FOR CARRYING OUT THE INVENTION

Figure 1:
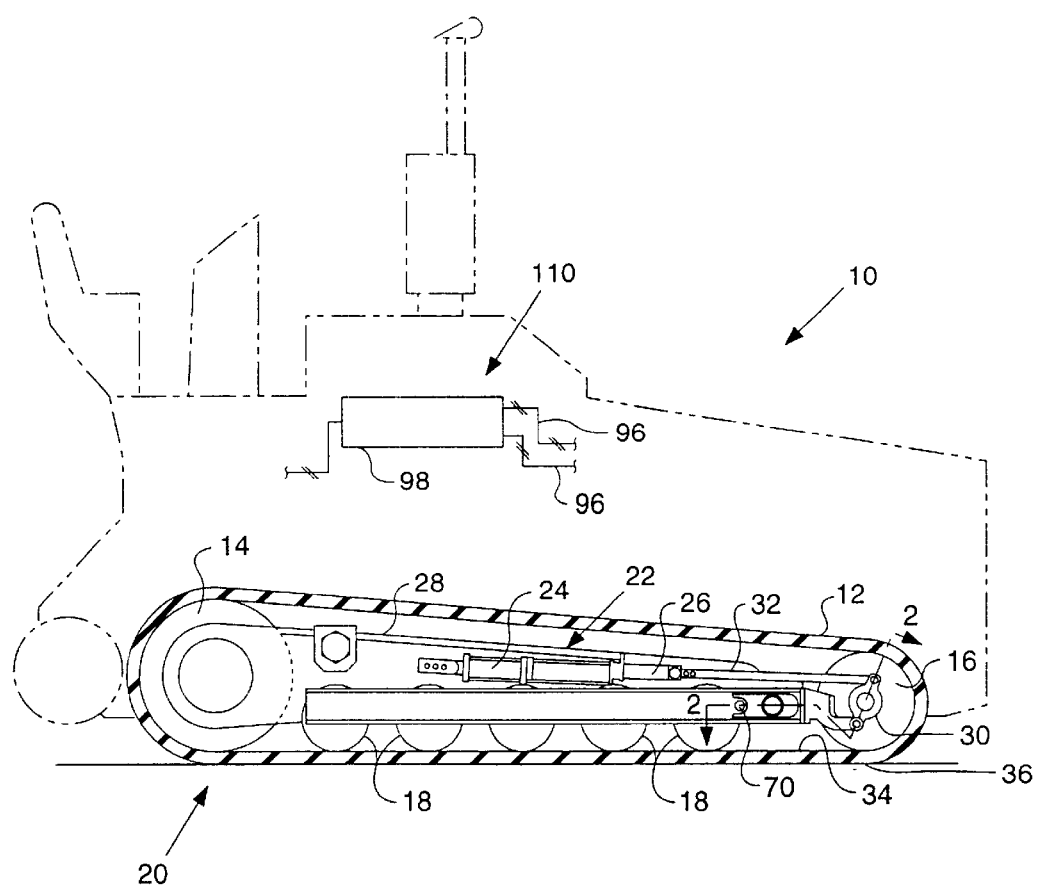
FIG. 1 is a diagrammatic elevational side view of an exemplary work machine supported by track roller assemblies embodying the present invention.

Referring to FIG. 1, a work machine 10 is represented as being an asphalt paver but could be an agricultural tractor, combine harvester or any track laying work machine. The work machine 10 includes an endless track 12, such as a rubber belt, a drive wheel 14, an idler wheel 16, and a plurality of track supporting rollers 18, collectively referred to as a track roller assembly 20. It should be recognized that one track roller assembly 20 (only one shown) is positioned on each of the opposite sides of the work machine 10. In as much as each track roller assembly 20 is substantially operatively and structurally similar, further reference will be made to only a single side of the work machine 10.

The idler wheel 16 maintains tension on the endless track 12 so as to prevent the endless track 12 from derailing or slipping over the drive wheel 14. In particular, the idler wheel 16 is coupled to a fluid cylinder 22, which urges the idler wheel 16 towards and away from drive wheel 14.

FIG. 1 further shows the relationship between the idler wheel 16 and the fluid cylinder 22. The fluid cylinder 22 includes a housing 24 and an actuator rod 26. The housing 24 is pivotally connected to a roller frame 28 of the work machine 10. The actuator rod 26 is pivotally connected to one end of a swing link 30 by a linkage 32 however the actuator rod 26 could be directly connected to the swing link 30. Swing link 30 is pivotally connected to the roller frame 28 as by pin. The idler wheel 16 is rotatably connected to the swing link 30. Hence, the swing link 30 and therefore the idler wheel 16 is urged away from the drive wheel 14 when the actuator rod 26 is extended out of the housing 24, hence placing a predetermined amount of tension on the endless track 12.

Figure 2:
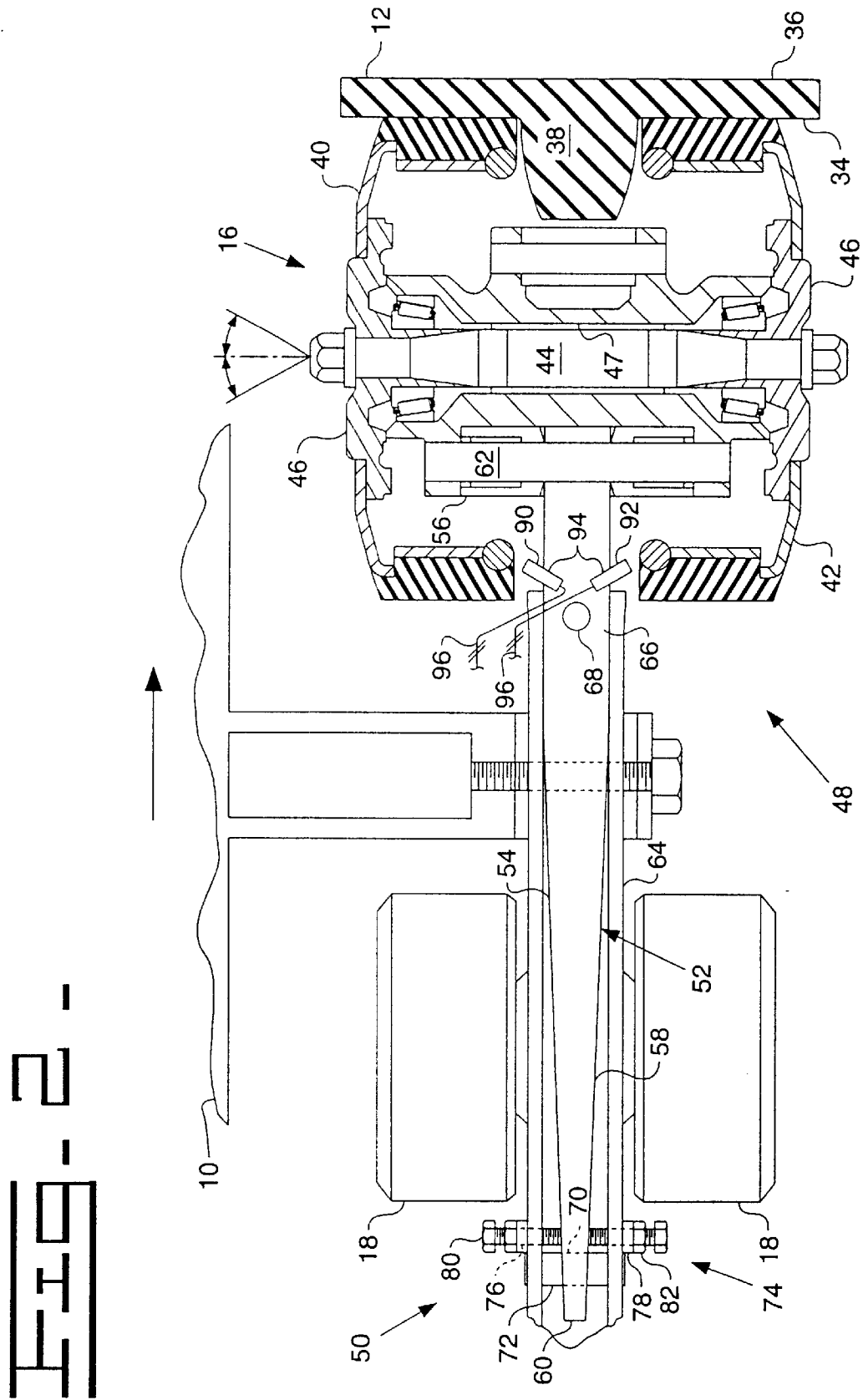
FIG. 2 is an enlarged sectional view of a first embodiment of the measuring and realigning apparatus taken along line 2—2 of the idler wheel of FIG. 1.

Referring to FIG. 2 the track 12, which is for example a rubber belt, defines an inner surface 34 and a ground contacting or outer surface 36. Positioned on the inner surface 34 and centrally located about the entire inner circumference of the track 12 is a plurality of guide elements 38. The idler wheel 16 is a segmented wheel that has a first wheel segment 40 and a second wheel segment 42 rotatably connected to opposite ends of a shaft 44. Specifically, first and second wheel segments 40,42 are connected to a pair of hubs 46 as by fasteners. Shaft 44 is positioned and rotatably supported in a bore 47 defined by the swing link 30. The first and second wheel segments 40,42 are spaced apart a predetermined distance and positioned on opposite sides of the plurality of guide elements 38.

Referring further to FIG. 2, an apparatus for measuring misalignment and realigning 48 the track 12 is shown. Forming part of the track frame 28 is an alignment apparatus 50. The alignment apparatus 50 includes an elongated member 52. The elongated member 52 includes two distinct portions a solid, rectangular portion 54 extending from a first end 56 and a lever portion 58 extending from a second end 60. The swing link 30 is pivotally connected to the first end 56 of the elongated member 52 and is retained there by a pin 62. The pivotal connection of the swing link 30 to the first end 56 allows for infinite positioning of the idler wheel 16 by the fluid cylinder 22 as described above.

The lever 58 of elongated member 52 is press fit into a hollow frame portion 64 of the roller frame 28. The press fit of the elongated member 52 into the hollow frame 64 supports the elongated member 52 and fixes a mid-portion 66 of the elongated member 52 from lateral movement. The rectangular portion 54 is held in the hollow frame portion 64 by a pin 68, which keeps the elongated member 54 from moving in a longitudinal direction within the hollow frame 64. A slot 70 is positioned in the second end 60 of the elongated member 52.

A support tube 72 extends laterally through and is welded to the hollow frame 64. The slot 70 at the second end 60 of the lever 58 slides over the support tube 72 as the lever 58 is pressed fitted into the hollow frame 64. The support tube 72 supports the second end 60 of the elongated member 52 and relieves vertical stresses on the hollow frame 64 which would otherwise be created by the weight of the work machine 10 being supported by the second end 60 of the elongated member 52.

Adjacent to the support tube 72 and forming part of the alignment apparatus 50 is an adjustment device 74. FIG. 2 shows each side of the hollow frame 64 has a hole 76 covered by a boss 78 for receiving a jack member 80. In this case, the holes 76 and bosses 78 are threaded and the jack members 80 are large bolts having lock nuts 82. After the elongated member 52 is press fitted into position, the jack member 80 are threaded into the holes 76 from the outside of the hollow frame 64 until they make contact with and fix the lateral position of the lever 58 of the elongated member 52. After the lateral position of the elongated member 52 is fixed the lock nuts 82 are tightened.

Still referring to FIG. 2 further definition is given to the apparatus for measuring misalignment and realigning 48 the track 12. A first sensor 90 is positioned adjacent the first wheel segment 40 and one of the opposite sides of the plurality of guide elements 38. A second sensor 92 is positioned adjacent the second wheel segment and the other of the opposite sides of the plurality of guide elements 38. The first and second sensors 90,92 are secure to the top or bottom of the hollow frame 64 portion of the roller frame 28 in a conventional manner as by fasteners (not shown). In this example the first and second sensors are infrared thermocouples 94 but could be pressure sensors or any of a number of different sensors for sensing contact between the guide elements 38 of the track 12 and the idler wheel 16. Electrical conductors 96 connect first and second sensors 90,92 to a controller 98.

Figure 3:
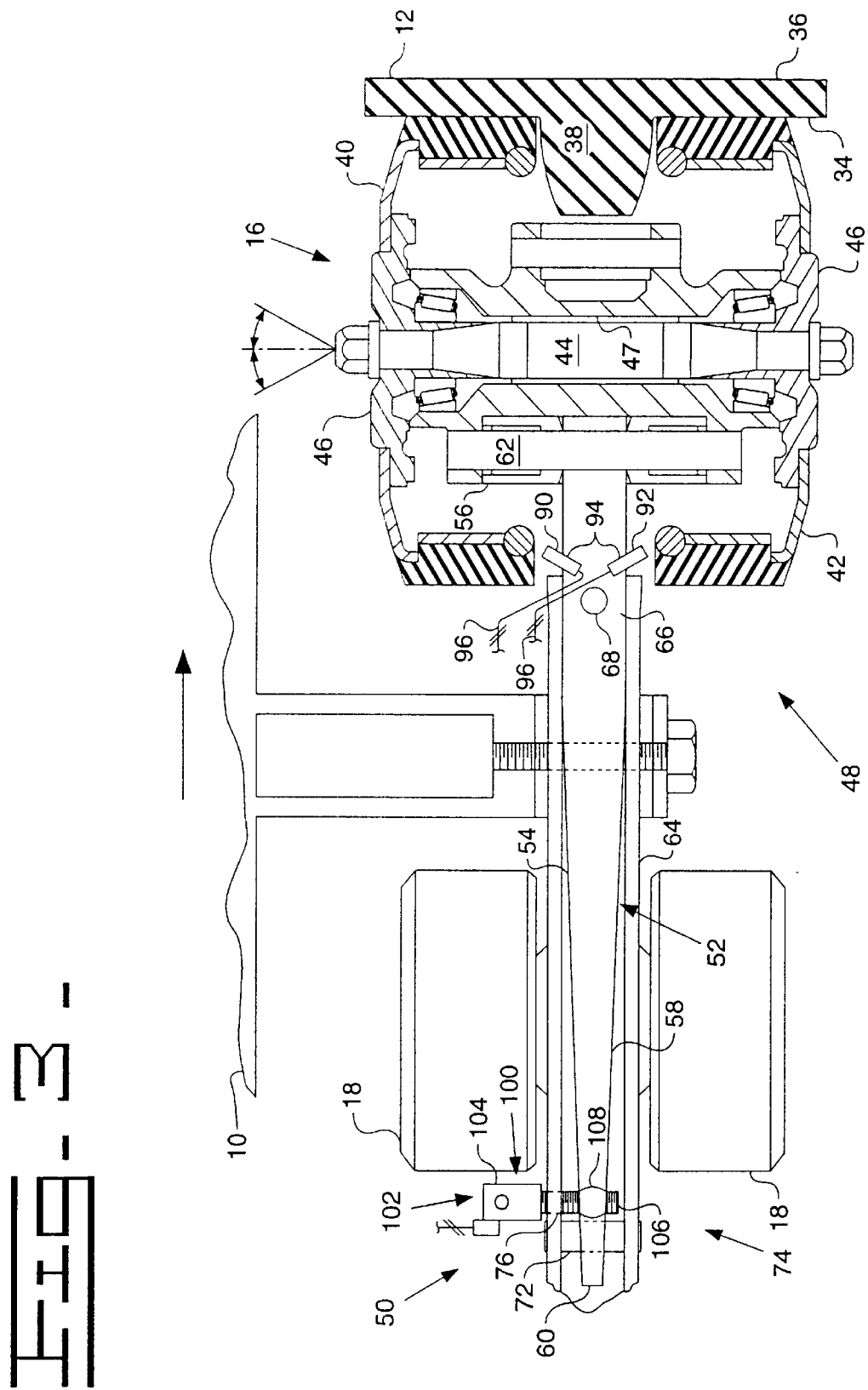
FIG. 3 is an enlarged sectional view of a second embodiment of the measuring and realigning apparatus taken along line 2—2 of the idler wheel of FIG. 1.

FIG. 3 shows another example for the adjustment device 74 of the alignment apparatus 50 with like element numbers representing like components. The hole 76 of the hollow frame 64 is adapted to receive an actuator 100. In this case, the actuator 100 is a fluid cylinder 102. Fluid cylinder 102 includes a housing 104 and an actuator rod 106. The housing 104 is pivotally connected chassis of the work machine 10 in a conventional manner as by trunion or clevis mount. The actuator rod 106 is connected to a spherical ball joint 108 positioned in the lever 58 forward of the slot 70 and support tube 72. After the elongated member 52 is press fit into position, the actuator 100 is used to adjust and fix the lateral position of the lever 58. Specifically, the fluid cylinder 102 is in communication with the controller 98, which is part of a machine control system 110. It should be recognized that communication between the controller 98 to actuator 100 could be through a number of known arrangements such as, radio frequency, direct electrical connection, etc.

FIG. 4 shows yet another example for the alignment apparatus 50 with like element numbers representing like components. One side of the hollow frame 64 has a hole 76 that is adapted to receive an actuator 100. In this embodiment, the actuator 100 is a motor 112 mounted to the top portion of the hollow frame 64. A pinion gear 114 is connected to the output of the motor 112. After the elongated member 52 is press fitted into position, the output of the motor 112 and the pinion gear 114 are inserted through the hollow frame 64 and positioned in meshing relationship with an arcuate rack 116. The arcuate rack 116 is connected to the second end 60 of the lever 58. The motor 112 is used to fix and the lateral position of the lever 58. Specifically, the motor 112 receives command signals the controller 98, which is part of the machine control system 110.

While the invention is susceptible to various modifications and alternative forms, embodiments for measuring misalignment and realigning the track 12 on a track laying work machine 10 have been described in detail and shown by way of example in the drawings. It should be understood, however, that there is no intent to limit the invention to the particular forms disclosed, but on the contrary, the intention is to cover all modifications, equivalents, and alternatives falling within the spirit and scope of the invention as defined by the appended claims.

Industrial Applicability

In operation the apparatus for measuring misalignment and realigning 48 monitors the alignment of the track 12 during operation of the work machine 10. For example, the first sensor 90 senses a parameter indicative of the contact between the first wheel segment 40 and the plurality of guide elements 38. In this example the parameter that is sensed by the first sensor 90 is heat that is generated by the contact. However, it should be understood that this parameter could be pressure or other parameters indicative of the contact. A first signal is delivered to the controller 98 by the first sensor 90. At the same time the second sensor 92 senses a parameter indicative of the contact between the second wheel segment 42 and the plurality of guide elements 38. A second signal is delivered to the controller 98 by the second sensor 92.

In a first embodiment the controller 98 is a stand alone unit such as laptop or dedicated unit that calculates an actual contact differential between the first and second signals generated by the first and second sensors 90,92. The actual differential is then manually compared to a desired differential range. The jack members 80 are then rotated, pivoting the idler wheel 16 responsive to the higher of the first and second signals until the actual differential fall within the desired range.

In another embodiment the controller 98 is part of the machine controller 110. After the controller 98 calculates an actual contact differential between the first and second signals generated by the first and second sensors 90,92. A control signal is sent to an actuator 100. As seen in FIGS. 3 and 4 the actuator can be either a fluid cylinder 102 or a motor 112 that are operatively connected to the lever member 58. The actuator 100 pivots the idler wheel 16 responsive to the higher of the first and second signals until the actual differential fall within the desired range.

Thus, an apparatus is provided for measuring misalignment and realigning 48 the idler wheel 16 of a track roller assembly 20. The apparatus 48 is configured to be used for purposes of initial assembly or maintenance, or can used as part of a machine control system 100 to automatically monitor and adjust alignment during operation of the work machine 10.

Other aspects, objects, and features of the present invention can be obtained from a study of the drawings, the disclosure, and the appended claims.

What is claimed is:

1. An apparatus for measuring misalignment and realigning (48) a track (12) on a work machine (10), the work machine (10) utilizing a pair of track roller assemblies (20) each having a track (12) entrained around a drive wheel (14) and an idler wheel (16), the idler wheel (16) having first and second wheel segments (40,42) one each being rotatably positioned on opposite sides of a plurality of guide elements (38) positioned on an inner surface (34) of the track (12) said apparatus (48) comprising:

a sensor (90) being positioned adjacent the first and second wheel segments (40,42); and a controller (98) being in communication with said sensor (90).

2. The apparatus (48) of claim 1 wherein said sensor (90) is positioned to measure the temperature of one of an inner shoulder of the first and second wheel segments (40,42) and the opposite sides of the plurality of guide elements (38) of the track (12).

3. The apparatus (48) of claim 2 wherein said sensor (90) is an infrared thermocouple (94).

4. The apparatus (48) of claim 2 further including an alignment apparatus (50).

5. The apparatus (48) of claim 4 wherein the alignment apparatus (50) further including a lever (58) being pivotally connected to the idler wheel (16).

6. The apparatus (48) of claim 5 further including an adjustment device (74) being connected with said lever (58).

7. The apparatus (48) of claim 6 wherein said adjustment device (74) is a pair of opposing jack members (80).

8. The apparatus (48) of claim 6 wherein the controller (98) is part of a machine control system (110).

9. The apparatus (48) of claim 8 wherein the machine control system (110) is in communication with the adjustment device (74).

10. The apparatus (48) of claim 9 wherein the adjustment device (74) is a fluid cylinder (102) being operatively associated with said lever (58).

11. The apparatus (48) of claim 9 wherein the adjustment device (74) is a motor (110) being operatively associated with said lever (58).

12. A track roller assembly (20) for a work machine (10) comprising:

a roller frame (28);

a track (12) having a plurality of guide elements (38) positioned on an inner surface (34) thereof;

a drive wheel (14) being rotatably connected to said roller frame (28);

an idler wheel (16) having first and second wheel segments (40,42) one each being rotatably positioned on opposite sides of a plurality of guide elements (38);

a first sensor (90) being positioned adjacent an inner shoulder of the first wheel segment (40) and one of the opposite sides of the plurality of guide elements (38);

a second sensor (92) being positioned adjacent an inner shoulder of the second wheel segment (42) and the other of the opposite sides of the plurality of guide elements (38); and a controller (98) being in communication with said first and second sensors (90,92).

13. The track roller assembly (20) of claim 12 wherein said first sensor (90) is positioned to measure the temperature of one of an inner shoulder of the first wheel segment (40), and said second sensor (92) is positioned to measure the temperature of an inner shoulder of the second wheel segment (42).

14. The track roller assembly (20) of claim 12 wherein said first sensor (90) is positioned to measure the temperature of one of the opposite sides of the plurality of guide elements (38) and said second sensor (92) is positioned to measure the temperature of the other of the opposite sides of the plurality of guide elements (38).

15. The track roller assembly (20) of claim 12 including an adjustment device (74) being in communication with said controller (98).

16. The track roller assembly (20) of claim 15 wherein the adjustment device (74) further including a lever (58) and an actuator (100), said lever (58) being pivotally connected to the idler wheel (16) and said actuator (100) being connected with said lever (58).

17. The track roller assembly (20) of claim 16 wherein the actuator (100) is one of a hydraulic cylinder (102) and a motor (112).

18. A method for aligning a track (12) of a work machine (10), the work machine (10) utilizing a pair of track roller assemblies (20) each having a track (12) entrained around a drive wheel (14) and an idler wheel (16), the idler wheel (16) having first and second wheel segments (40,42) rotatably positioned on opposite sides of a plurality of guide elements (38) positioned on an inner surface (34) of the track (12) comprising the steps of:

sensing a parameter indicative of the contact between the first wheel segment (40) and the plurality of guide elements (38), and responsively delivering a first signal;

sensing a parameter indicative of the contact between the second wheel segment (42) and the plurality of guide elements (38), and responsively delivering a second signal;

determining an actual contact differential based on a comparison of the first signal and the second signal;

comparing the actual differential with a desired differential range; and pivoting the idler wheel (16) responsive to the higher of the first and second signals until the actual differential falls within the desired differential range.

19. The method of claim 18 wherein the steps of sensing include measuring the heat generated by the contact between the first and second wheel segments and the plurality of guide elements.

20. The method of claim 18 wherein the steps of sensing include measuring the pressure generated by the contact between the first and second wheel segments (40,42) and the plurality of guide elements (38).

21. The method of claim 18 wherein the step of pivoting includes rotating a pair of opposing jack members (80) to pivot the idler wheel (16).

22. The method of claim 18 wherein the step of pivoting includes actuating one of a fluid cylinder (102) and a motor (112) to pivot the idler wheel (16).

* * * * *